United States Patent
Borland et al.

(10) Patent No.: US 9,297,487 B2
(45) Date of Patent: Mar. 29, 2016

(54) INSTALLATION OF A VALVE IN A PIPELINE

(71) Applicants: Robin N. Borland, Smethport, PA (US); Dennis R. Jarnecke, River Forest, IL (US); Edward B. Johnston, Oak Park, IL (US)

(72) Inventors: Robin N. Borland, Smethport, PA (US); Dennis R. Jarnecke, River Forest, IL (US); Edward B. Johnston, Oak Park, IL (US)

(73) Assignee: Gas Technology Institute, Des Plaines, IL (US)

( * ) Notice: Subject to any disclaimer, the term of this patent is extended or adjusted under 35 U.S.C. 154(b) by 156 days.

(21) Appl. No.: 14/066,123

(22) Filed: Oct. 29, 2013

(65) Prior Publication Data

US 2015/0115186 A1    Apr. 30, 2015

(51) Int. Cl.
| | | |
|---|---|---|
| F16K 43/00 | (2006.01) | |
| F16L 41/06 | (2006.01) | |
| F16K 1/00 | (2006.01) | |
| F16L 41/16 | (2006.01) | |
| F16L 55/10 | (2006.01) | |

(52) U.S. Cl.
CPC . *F16L 41/06* (2013.01); *F16K 1/00* (2013.01); *F16L 41/16* (2013.01); *F16L 55/1018* (2013.01); *Y10T 137/0458* (2015.04); *Y10T 137/0463* (2015.04)

(58) Field of Classification Search
CPC ..... F16L 41/06; F16L 55/105; F16L 55/1018; Y10T 137/6123
USPC .......................... 137/315.17, 315.18, 317, 318
See application file for complete search history.

(56) References Cited

U.S. PATENT DOCUMENTS

| | | | | |
|---|---|---|---|---|
| 3,460,553 | A | * | 8/1969 | Leopold, Jr. et al. ...... 137/15.13 |
| 3,827,448 | A | * | 8/1974 | Alba .......................... 137/15.11 |
| 3,948,282 | A | * | 4/1976 | Yano .......................... 137/15.17 |
| 4,223,925 | A | * | 9/1980 | Reneau et al. ................. 285/197 |
| 4,978,255 | A | * | 12/1990 | Gale et al. ...................... 408/1 R |
| 5,074,526 | A | * | 12/1991 | Ragsdale et al. .............. 251/267 |
| 5,076,311 | A | * | 12/1991 | Marschke .................. 137/15.14 |
| 5,327,923 | A | * | 7/1994 | Eischen et al. ............. 137/15.17 |
| 5,620,020 | A | * | 4/1997 | Collins ......................... 137/318 |
| 6,341,619 | B1 | * | 1/2002 | Beninga ....................... 137/318 |
| 6,990,718 | B2 | * | 1/2006 | Gregory ....................... 29/455.1 |
| 8,613,291 | B2 | * | 12/2013 | Heffernan ..................... 137/317 |
| 2010/0212754 | A1 | * | 8/2010 | Ayers et al. ................... 137/318 |

OTHER PUBLICATIONS https://www.youtube.com/watch?v=n6rzFuFi5Qs, Uploaded Feb. 4, 2010.
https://www.youtube.com/watch?v=wcpyq3kpWZw, Uploaded Nov. 4, 2010.
https://www.youtube.com/watch?v=z7fPNufZqUg, Published Sep. 18, 2012.
https://www.youtube.com/watch?NR=1&feature=fvwp&v=EP13pv8sPMM, Uploaded Jun. 29, 2011.
http://www.valveinsert.com/, Dated Jul. 28, 2012.

(Continued)

*Primary Examiner* — John K Fristoe, Jr.
*Assistant Examiner* — Reinaldo Sanchez-Medina
(74) *Attorney, Agent, or Firm* — Pauley Erickson & Kottis

(57) ABSTRACT

A process and apparatus for installing a valve in a pipeline while the pipeline is pressurized, and without leakage of pipeline media. A valve body is formed by attaching a sleeve with an annular space to a pipeline, filling the annular space with curable material, and then machining a cylindrical hole through the pipe, into which a valve is inserted.

19 Claims, 4 Drawing Sheets

(56) References Cited

OTHER PUBLICATIONS https://www.youtube.com/watch?v=kqNvqdpeJQY, Uploaded Dec. 22, 2011.
https://www.youtube.com/watch?v=iRNxt9yv1Ug, Published Aug. 2, 2012.
https://www.youtube.com/watch?v=T0TbTY5zy0, Uploaded Feb. 8, 2011.
https://www.youtube.com/watch?v=nw72vFdX3uw, Uploaded Aug. 29, 2012.
https://www.youtube.com/watch?v=VWhmva4pQIQ, Uploaded Mar. 27, 2010.

* cited by examiner

INSTALLATION OF A VALVE IN A PIPELINE

BACKGROUND OF THE INVENTION

1. Field of the invention

This invention relates to a process for installing a valve in an existing pipeline, and more particularly to installing a valve without shutting down the pipeline.

2. Description of Related Art

With increased demands for pipeline safety and integrity, there is a need to be able to install valves in existing piping networks without disrupting the operation of the pipeline. There are products currently used for water pipelines, but they are not ideal for use with higher pressure gas pipelines.

SUMMARY OF THE INVENTION

This invention relates to a process and apparatus for installing a valve in a pipeline while the pipeline is pressurized, and without leakage of pipeline media. A valve body is formed by attaching a sleeve with an annular space to a pipeline, filling the annular space with a solidifiable material, and then machining a cylindrical hole through the solidified material and pipe into which a valve is inserted.

It is one object of this invention to provide a process of installing a valve in an existing pipeline. The method can include attaching a sleeve about the pipeline, filling an annular space between the sleeve and the pipeline, removing a section of the pipeline, and replacing the removed section of the pipeline with the valve. Exemplary valve-types include ball valves, plug valves, or any suitable valve.

It is another object of this invention to provide a process and/or apparatus by which a valve is installed in an existing pipeline by attaching a sleeve about a pipeline, filling an annular space between the sleeve and the pipeline with a liquid curable material, curing the curable material within the annular space, machining a cylindrical hole in the cured curable material and the pipeline to remove a section of the pipeline, and replacing the removed section of the pipeline with a valve. The valve can be, for example, a ball valve or a full port plug valve, such as a tapered or cylindrical type packaged inside a cartridge.

The subject invention preferably includes a valve system for an existing pipeline. The valve system desirably includes a sleeve forming an internal annular space and including an attachment flange surrounding a sleeve opening, a liquid curable material to fill the internal annular space, and a ball or other valve cartridge having a circumference corresponding to the sleeve opening.

In embodiments of this invention, a two-part, split sleeve is attached, e.g., welded or bolted, to and/or around the outside of the pipeline at the spot of the valve insertion. The sleeve has a flanged connector around a sleeve opening. There is desirably an annular space created by the sleeve between the pipeline and the sleeve. The annular space of the attached sleeve is filled with a filling material, such as an epoxy or other liquid curable material. The fill material is hardened or cured to form a solid filling. A temporary gate valve is attached to the sleeve flange. A tapping machine, or other suitable cutting or machining device, is assembled to the temporary gate valve opposite the sleeve, the gate valve opened, and a cylindrical portion including the filling material and a section of the pipe is cut and removed. If needed, the hole can be finish machined or reamed. The gate valve is then closed, and the tapping machine is removed. A valve insertion apparatus with a pressurized chamber containing the valve cartridge is then attached to the temporary gate valve, the gate valve is then opened, and the valve cartridge is inserted in to the sleeve.

BRIEF DESCRIPTION OF THE DRAWINGS

These and other objects and features of this invention will be better understood from the following detailed description taken an conjunction with the drawings.

DESCRIPTION OF THE PRESENTLY PREFERRED EMBODIMENTS

Figure 1:
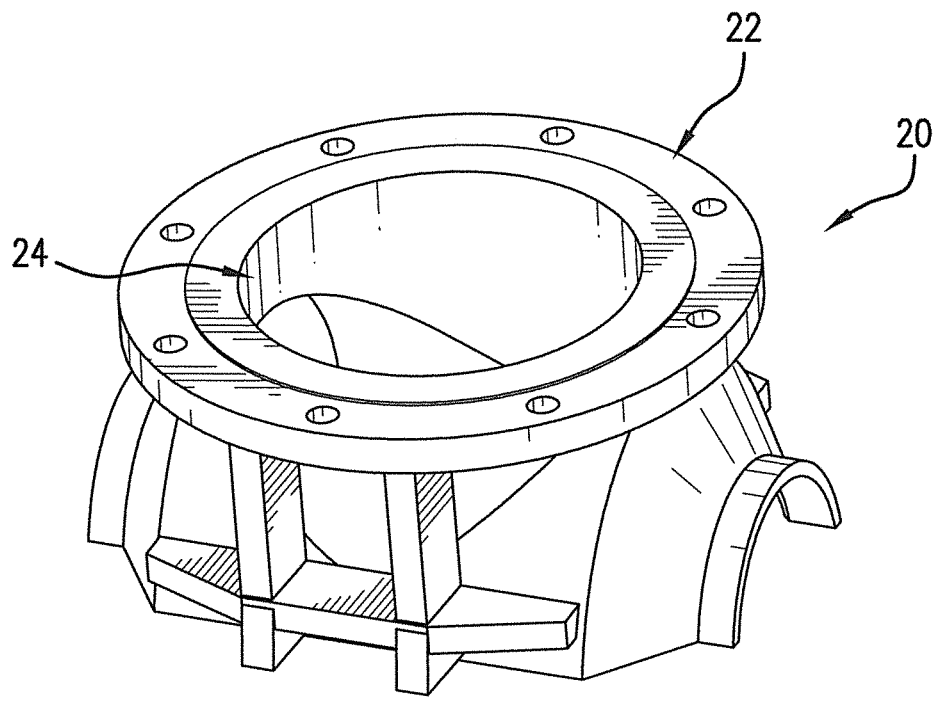
FIG. 1 is a perspective view of a portion of a sleeve according to one embodiment of this invention.
Figure 2:
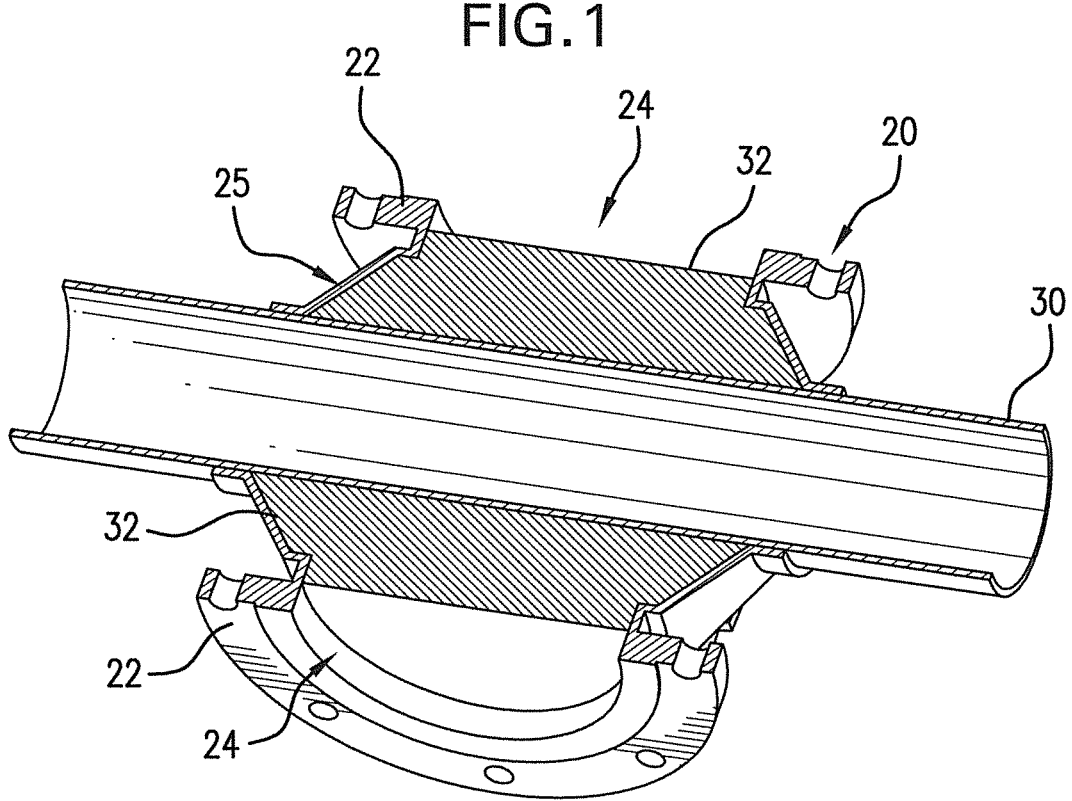
FIG. 2 is a sectional view of a sleeve attached around a pipe, according to one embodiment of this invention.

FIG. 1 shows one half of a two-part sleeve 20 that is adapted to attach around a pipeline 30, as shown in FIG. 2. In the embodiment shown in FIGS. 1 and 2, each half of sleeve 20 includes as flange 22 for receiving tools and/or other attachments, around a sleeve opening 24. Each half of the sleeve 20 also includes body 26 forming an annular space 25 between the sleeve 20 and the pipeline 30. The sleeve opening(s) 24 provide access to the annular space 25 and the pipe 30 within the attached sleeve 20. The body 26 includes a semi-circular receiving opening for fitting around the pipe 30, as shown in FIG. 2. The two halves of the sleeve 20 can be attached to the sleeve by any suitable method, such as being welded, glued, and/or bolted (with a suitable gasket) onto and/or around pipe 30.

In preferred embodiments of this invention, as shown in FIG. 2, the annular space 25 between the sleeve 20 and pipe 30 is desirably filled with a filling material 32. The filling material can be any suitable material, such as a solidifiable material that can be applied as a powder or liquid and then solidified. Exemplary solidifiable materials include liquid curable materials aerials such as epoxy or other polymers. Other exemplary solidifiable materials include, without limitation, low melting point metals such as lead, tin, or bismuth or alloys of low melting point metals, and/or flow-able powder materials such as a polymer which when heated or pressurized can form a solid. The size, shape, and configuration of the sleeve 20 and the annular space 25, and/or the type and necessary amount of the filling material 32 can vary depending on need such as to reduce the amount of filling material needed and/or to minimize the time and/or heat generated during the curing process. In one embodiment of this invention, the filling material is pre-installed in the sleeve prior to application of the sleeve to the pipeline. In alternative embodiments of this invention, the sleeve can be a flattened plate, have solid metal in filling the illustrated annular space, and/or include an appropriately sized cylindrical-shaped bore in the space-less sleeve or the pre-installed filling material to receive the valve, as discussed further below, thereby not having an annular space requiring fill. However, the curing of the filling material can provide additional sealing for the valve, at less weight and cost than a sleeve having additional metal and/or welding.

Figure 3:
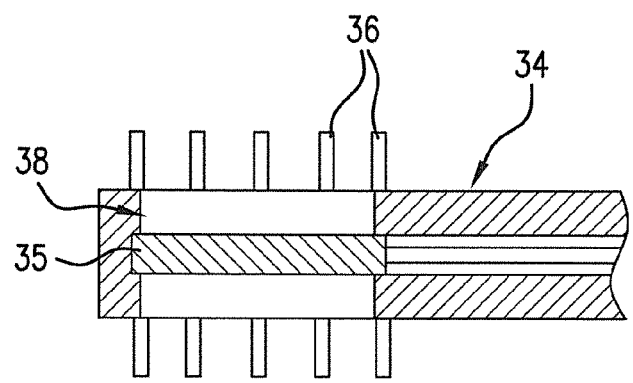
FIG. 3 is a sectional view of it temporary gate valve attachment, according to one embodiment of this invention.

A temporary valve, such as a gate valve 34 shown in FIG. 3 is attached to one of the flanges 22 to allow access to the filled annular space 25. In the embodiment of FIGS. 1 and 2, which has two opposing flanges 22, a blind flange or other suitable cover attachment can be attached to the second flange 22. The gate valve 34 includes bolts 36 for attachment to the flange 22. A gate 35 is moveable within the valve 34 to open and close a valve passageway 38 aligned with the sleeve opening 24, thereby opening and closing the sleeve opening 24.

Figure 4:
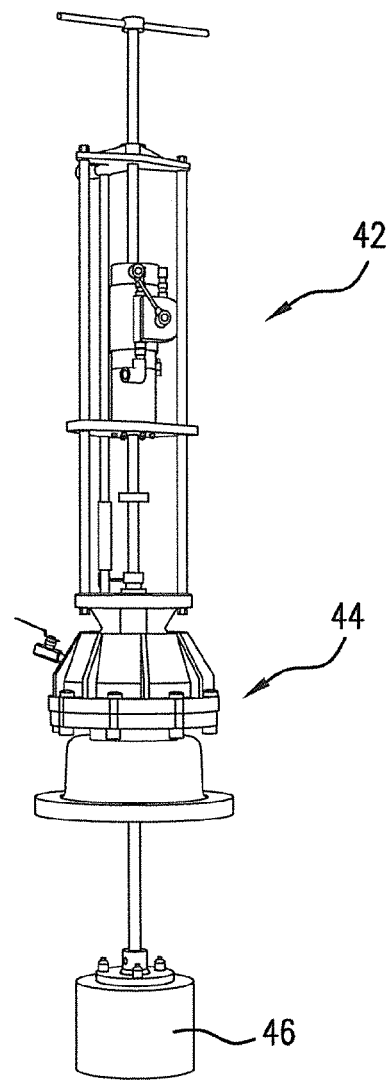
FIG. 4 shows a lapping apparatus according to one embodiment of this invention.
Figure 5:
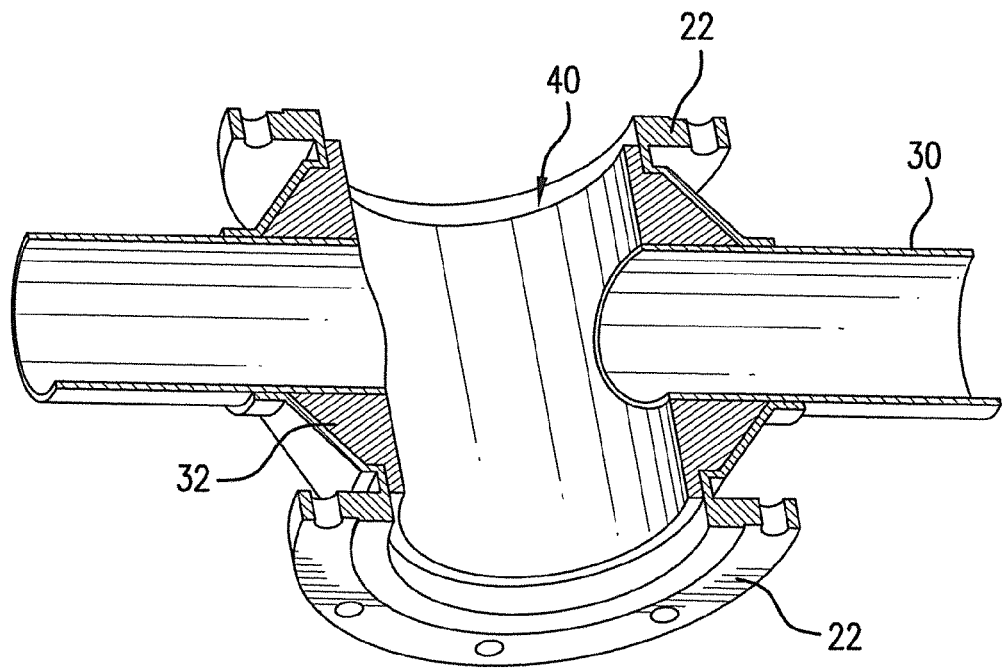
FIG. 5 is a sectional view of a sleeve attachment with a cylindrical hole cut through the pipe according to one embodiment of this invention.

A section of the pipeline 30 is removed to allow a valve to be inserted. Referring to FIG. 2, a cylindrical hole 40, shown in FIG. 5, such as sized for the valve insert, is cut through both the filling material 32 and the pipe 30. FIG. 4 illustrates an exemplary tapping machine 42 for machining or cutting the hole 40. The tapping machine includes an attachment section 44 for attaching to the bolts 36 of the gate valve 34, and an extendable cutting tool or bit 46 for cutting the hole 40. The tapping machine 42 is assembled to the temporary gate valve 34, the gate valve 34 is opened, and the tool 46 is extended to cut into, and remove a cylindrical portion of, the filling material 32 and a section of the pipe 30. If desired or needed, the hole 40 can be finish machined or reamed. Upon completion, the gate valve 34 is closed and the tapping machine 42 removed.

Figure 6:
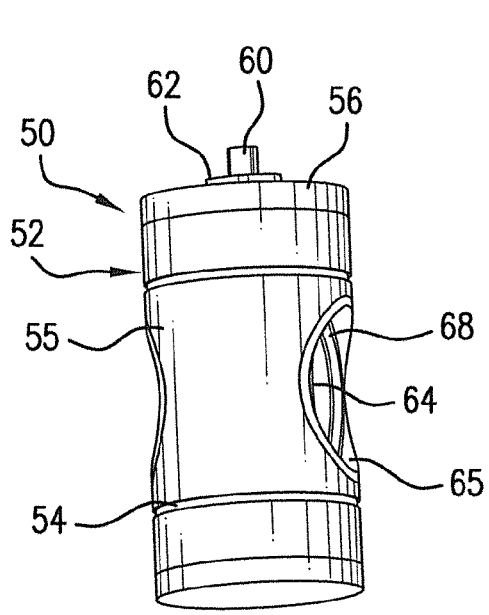
FIGS. 6 and 7 show an exemplary valve accordance to one embodiment of this invention.
Figure 7:
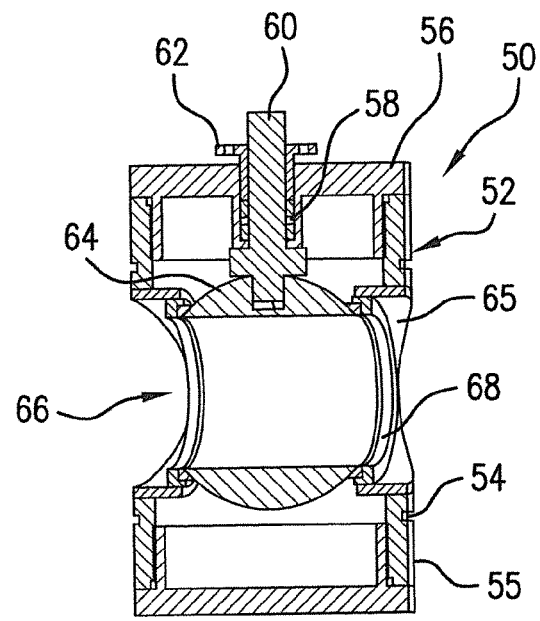

The removed section of the pipe 30 is replaced with any suitable valve, such as a ball valve or a plug valve within a suitable cartridge. FIGS. 6 and 7 illustrate an exemplary valve 50 according to embodiments of this invention. The valve 50 is a ball valve having a valve cartridge 52 with seal grooves 54 in an outer surface 55 for receiving one or more sealing members to be disposed between the cartridge 52 and the filling material 32. As shown in FIG. 7, the valve cartridge 52 includes a bonnet end cap 56 with a stuffing box 58 that receives and/or seals a stem 60 that extends through a gland 62 and the bonnet 56 to connect with a ball 64. The ball 64 has an opening 66 therethrough and is rotatable by the stem 60 within a ball seat 68. The ball valve cartridge 52 also includes an adapter 65 for aligning with the cut formed in the pipeline 30.

Figure 8:
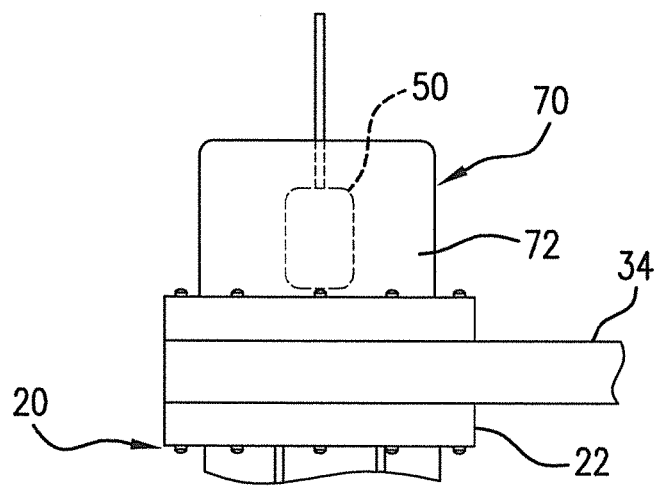
FIG. 8 shows a valve insertion according to one embodiment of this invention.
Figure 9:
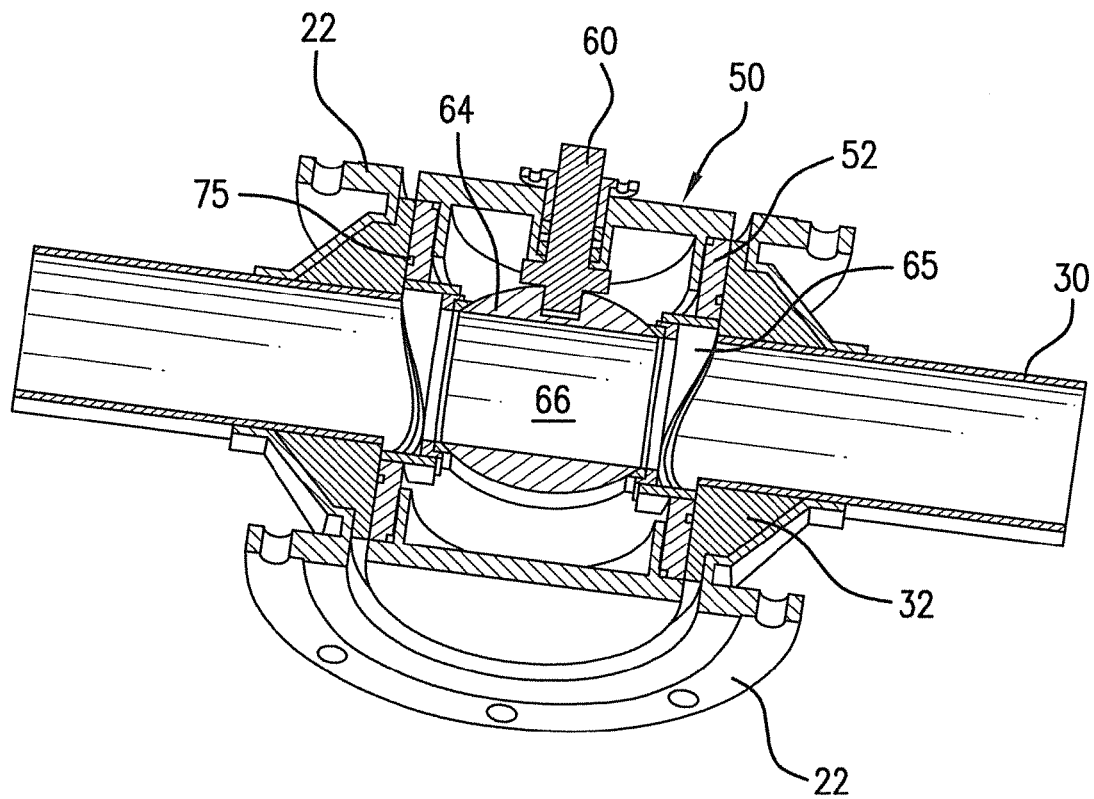
FIG. 9 is a sectional view of an inserted valve according to one embodiment of this invention.

FIG. 8 representatively illustrates a valve insertions apparatus 70 for replacing the removed section of the pipeline 30 with the ball valve 50. The valve insertion apparatus 70 includes a pressurized chamber 72 that attaches to the gate valve 34. The chamber 72 contains the bail valve 50. With the valve insertion apparatus 70 thereon, the gate valve 34 is opened and the ball valve cartridge 52 is inserted by the valve insertion apparatus 70 into the sleeve to the position shown in FIG. 9. As shown in FIG. 9, the adapter 65 aligns with the cut in the pipe 30, and sealing elements 75, such as rubber or silicone O-rings, are disposed in the grooves 54 between the valve cartridge and the hardened filling material 32. As will be appreciated, the valve 50 is inserted with the ball 64 in an open position, aligning opening 66 parallel with the pipeline to minimize any disruption of the flow within the pipeline 30. When the valve 50 is seated, the valve insertion apparatus 70 is retracted and removed. The gate valve 34 is then removed. Any additional necessary caps or sealants can be applied as needed.

Thus the invention provides a method and system for inserting a valve in an active pipeline, without stopping the pipeline flow and with minimal disruption of the pipeline. The use of a ball valve according to this invention is capable of withstanding higher pressures than other valves, such as gate valves. The full port provided by the ball valve can allow for pipeline cleaning and inspection pigs to pass therethrough. There are also minimal or no cavities which can allow the collection of pipeline debris or residue. Furthermore, any shavings produced during the tapping/machining step can be isolated from the flow after installation, as they will be at generally collect beneath the valve cartridge, outside of the flow stream.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A method of installing a valve in an existing pipeline, the method comprising: attaching a sleeve about the pipeline; filling an annular space between the sleeve and the pipeline with a solidifiable material; solidifying the solidifiable material within the annular space to form a solidified material; attaching a temporary valve to the sleeve; machining a cylindrical hole through the solidified material and through a section of the pipeline; removing the section of the pipeline from the sleeve; attaching a valve insertion apparatus including a pressurized chamber containing a valve cartridge to the temporary valve attached to the sleeve; and replacing the removed section of the pipeline with the valve cartridge sized to replace the removed section, the valve cartridge including a full port valve opening having an opening diameter corresponding to a diameter of the pipeline.

2. The method of claim 1, wherein the valve comprises a ball valve.

3. The method of claim 2, wherein the valve cartridge includes an adapter for aligning with the pipeline, a plurality of seal grooves in an outer surface, and at least one sealing member that fits into at least one of the seal grooves.

4. The method of claim 1, wherein the sleeve comprises a sleeve opening spaced apart from the pipeline, and the solidified material fills an area between the sleeve opening and the pipeline.

5. The method of claim 4, wherein a diameter of the cylindrical hole is less than a diameter of the sleeve opening.

6. The method of claim 1, wherein the cylindrical hole has a diameter larger than a pipeline diameter, a valve cartridge is correspondingly sized to the diameter of the cylindrical hole, and the full port valve opening has an opening diameter corresponding to the pipeline diameter.

7. The method of claim 1, further comprising inserting a cylindrical valve cartridge into the cylindrical hole.

8. The method of claim 1, further comprising attaching the temporary valve over a sleeve opening in the sleeve before removing the section.

9. A method of installing a valve in an existing pipeline, the method comprising: attaching a sleeve about a pipeline; filling an annular space between the sleeve and the pipeline with a liquid curable material; curing the curable material within the annular space; attaching a temporary valve to the sleeve; machining a cylindrical hole having a diameter larger than a pipeline diameter in the cured curable material and extending through all sides of the pipeline to remove a section of the pipeline from the sleeve; removing the section of the pipeline from the sleeve; attaching a valve insertion apparatus including a sealed chamber containing a ball valve to the temporary valve attached to the sleeve; and replacing the removed section of the pipeline with the ball valve including a full port valve opening having an opening diameter corresponding to a diameter of the pipeline.

10. The method of claim 9, further comprising attaching the temporary valve to the sleeve before the machining.

11. The method of claim 10, further comprising closing the temporary valve after removing the section of the pipeline, and attaching the valve insertion apparatus to the temporary valve.

12. The method of claim 10, wherein the temporary valve is attached to a flange of the sleeve about a sleeve opening.

13. The method of claim 9, wherein the sleeve includes a flange about a sleeve opening and a machining apparatus seals the sleeve opening during the machining.

14. The method of claim 13, further comprising closing a temporary valve over the sleeve opening after machining.

15. The method of claim 9, wherein the ball valve comprises a valve cartridge correspondingly sized to the cylindrical hole, the valve cartridge including an adapter for aligning with the pipeline, wherein upon insertion in the cylindrical hole, the valve cartridge has a first end on a first side of the pipeline and an opposing second end disposed beyond an opposing second side of the pipeline to align the full port valve opening with a passageway of the pipeline.

16. The method of claim 15, wherein the valve cartridge comprises a plurality of seal grooves in an outer surface, and at least one sealing member that fits into at least one of the seal grooves.

17. A valve system for an existing pipeline, comprising: a sleeve forming an internal annular space and including an attachment flange surrounding a sleeve opening; a liquid curable material to fill and solidify within the internal annular space; a temporary valve fitting the attachment flange and over the sleeve opening; a ball valve cartridge having a circumference correspondingly sized to the sleeve opening, and including a full port valve opening having an opening diameter corresponding to a diameter of the pipeline; and a valve insertion apparatus including a sealed chamber containing the ball valve and adapted to attach to the temporary valve.

18. The valve system of claim 17, wherein the ball valve cartridge comprises an adapter for aligning with a cut formed in the pipeline.

19. The valve system of claim 17, wherein the ball valve cartridge comprises a plurality of seal grooves in an outer surface and at least one sealing member that fits into at least one of the seal grooves.

* * * * *